United States Patent
Yamaguchi

(10) Patent No.: US 9,740,942 B2
(45) Date of Patent: Aug. 22, 2017

(54) MOVING OBJECT LOCATION/ATTITUDE ANGLE ESTIMATION DEVICE AND MOVING OBJECT LOCATION/ATTITUDE ANGLE ESTIMATION METHOD

(71) Applicant: NISSAN MOTOR CO., LTD., Yokohama-shi, Kanagawa (JP)

(72) Inventor: Ichiro Yamaguchi, Sagamihara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 19 days.

(21) Appl. No.: 14/651,282

(22) PCT Filed: Nov. 18, 2013

(86) PCT No.: PCT/JP2013/080997
§ 371 (c)(1),
(2) Date: Jun. 11, 2015

(87) PCT Pub. No.: WO2014/091877
PCT Pub. Date: Jun. 19, 2014

(65) Prior Publication Data
US 2015/0332100 A1    Nov. 19, 2015

(30) Foreign Application Priority Data

Dec. 12, 2012  (JP) ................................. 2012-270979
Dec. 12, 2012  (JP) ................................. 2012-270980

(51) Int. Cl.
*G06K 9/00*    (2006.01)
*G02B 13/00*    (2006.01)
(Continued)

(52) U.S. Cl.
CPC ............ *G06K 9/00798* (2013.01); *B60R 1/00* (2013.01); *G01C 21/28* (2013.01);
(Continued)

(58) Field of Classification Search
CPC .. G06K 9/00798; G06K 9/209; G06K 9/4604; G06T 7/75; G06T 7/251;
(Continued)

(56) References Cited

U.S. PATENT DOCUMENTS

2008/0180527 A1    7/2008   Nixdorf et al.
2009/0296987 A1*   12/2009  Kageyama ......... G06K 9/00798
                                                          382/103
(Continued)

FOREIGN PATENT DOCUMENTS

JP         2006010328 A    1/2006
JP         2006115265 A    4/2006
(Continued)

*Primary Examiner* — Tung Vo
*Assistant Examiner* — Joseph Becker
(74) *Attorney, Agent, or Firm* — Young Basile Hanlon & MacFarlane, P.C.

(57) ABSTRACT

A moving object location/attitude angle estimation device acquires a fish-eye lens image capturing a surrounding environment of a moving object with a fish-eye lens, and acquires a less distorted pinhole image for a predetermined region of the fish-eye lens image. Then, a bend degree of a driving road in a travelling direction of the moving object is detected. When the detected bend degree is less than a predetermined value, the pinhole image is selected. On the other hand, when the bend degree is not less than the predetermined value, the fish-eye lens image is selected. Thereafter, a location and an attitude angle of the moving object are estimated by matching edge information of the selected image with a three-dimensional map data.

12 Claims, 11 Drawing Sheets

(51) Int. Cl.
*B60R 1/00* (2006.01)
*G06K 9/46* (2006.01)
*G06T 7/20* (2017.01)
*G06T 5/00* (2006.01)
*G01C 21/28* (2006.01)
*G06K 9/20* (2006.01)
*G06T 7/73* (2017.01)
*G06T 7/246* (2017.01)

(52) U.S. Cl.
CPC ......... *G02B 13/0015* (2013.01); *G06K 9/209* (2013.01); *G06K 9/4604* (2013.01); *G06T 5/006* (2013.01); *G06T 7/20* (2013.01); *G06T 7/251* (2017.01); *G06T 7/75* (2017.01); *G06T 2207/10016* (2013.01); *G06T 2207/30252* (2013.01)

(58) Field of Classification Search
CPC . G06T 7/20; G06T 5/006; G06T 2207/30252; G06T 2207/10016; G01C 21/28; G02B 13/0015; B60R 1/00
USPC ........................................................ 348/113
See application file for complete search history.

(56) References Cited

U.S. PATENT DOCUMENTS

| | | |
|---|---|---|
| 2012/0050489 A1 | 3/2012 | Gupta et al. |
| 2012/0062745 A1 | 3/2012 | Han et al. |
| 2012/0162415 A1* | 6/2012 | Wu .................... H04N 7/18 348/142 |
| 2013/0177211 A1 | 7/2013 | Watanabe et al. |

FOREIGN PATENT DOCUMENTS

| | | |
|---|---|---|
| JP | 2007288444 A | 11/2007 |
| JP | 2009199572 A | 9/2009 |
| JP | 2012527681 A | 11/2012 |
| WO | 2012039496 A1 | 3/2012 |

* cited by examiner

US 9,740,942 B2

MOVING OBJECT LOCATION/ATTITUDE ANGLE ESTIMATION DEVICE AND MOVING OBJECT LOCATION/ATTITUDE ANGLE ESTIMATION METHOD

CROSS REFERENCE TO RELATED APPLICATIONS

This application is based upon and claims the benefit of priority from Japanese Patent Application No. 2012-270979 and Japanese Patent Application No. 2012-270980, each filed on Dec. 12, 2012; the entire contents of each incorporated herein by reference.

TECHNICAL FIELD

The present invention relates to a moving object location/attitude angle estimation device and a method thereof for estimating a location and an attitude angle of a moving object.

BACKGROUND

There has heretofore been developed a technology for calculating a self-location of a moving object by matching three-dimensional map information with an image taken with a fish-eye lens camera. Japanese Patent Application Publication No. 2006-10328 discloses such a technology.

With this technology, an image of a traffic light is taken with a fish-eye lens camera installed in a vehicle, and an elevation angle and a horizontal angle with respect to the vehicle are calculated from the taken image of the traffic light, thereby specifying a current location of the vehicle based on the light-emission position coordinates and the height of the traffic light.

However, the conventional technology described above has a problem that estimation of the self-location of the vehicle requires a traffic light and the self-location cannot be estimated at an intersection, on a single road or the like with no traffic lights.

SUMMARY

Therefore, the present invention has been proposed in consideration of the above situation. It is an object of the present invention to provide a moving object location/attitude angle estimation device and a moving object location/attitude angle estimation method, capable of estimating a location and an attitude angle of a moving object without a specific device such as a traffic light.

In order to achieve the above object, according to the present invention, a fish-eye lens image is acquired, which captures a surrounding environment of a moving object with a fish-eye lens, and a less distorted pinhole image is acquired for a predetermined region of the fish-eye lens image. Then, a bend degree of a driving road in a travelling direction of the moving object is detected, the pinhole image is selected when the detected bend degree is less than a predetermined value, and the fish-eye lens image is selected when the bend degree is not less than the predetermined value. Once the image is thus selected, a location and an attitude angle of the moving object are estimated by matching edge information of the selected image with edge information of a virtual image extracted from three-dimensional map data.

DETAILED DESCRIPTION OF EMBODIMENTS

With reference to the drawings, first to seventh embodiments to which the present invention is applied are described below.

First Embodiment

Configuration of Moving Object Location/Attitude Angle Estimation Device

Figure 1:
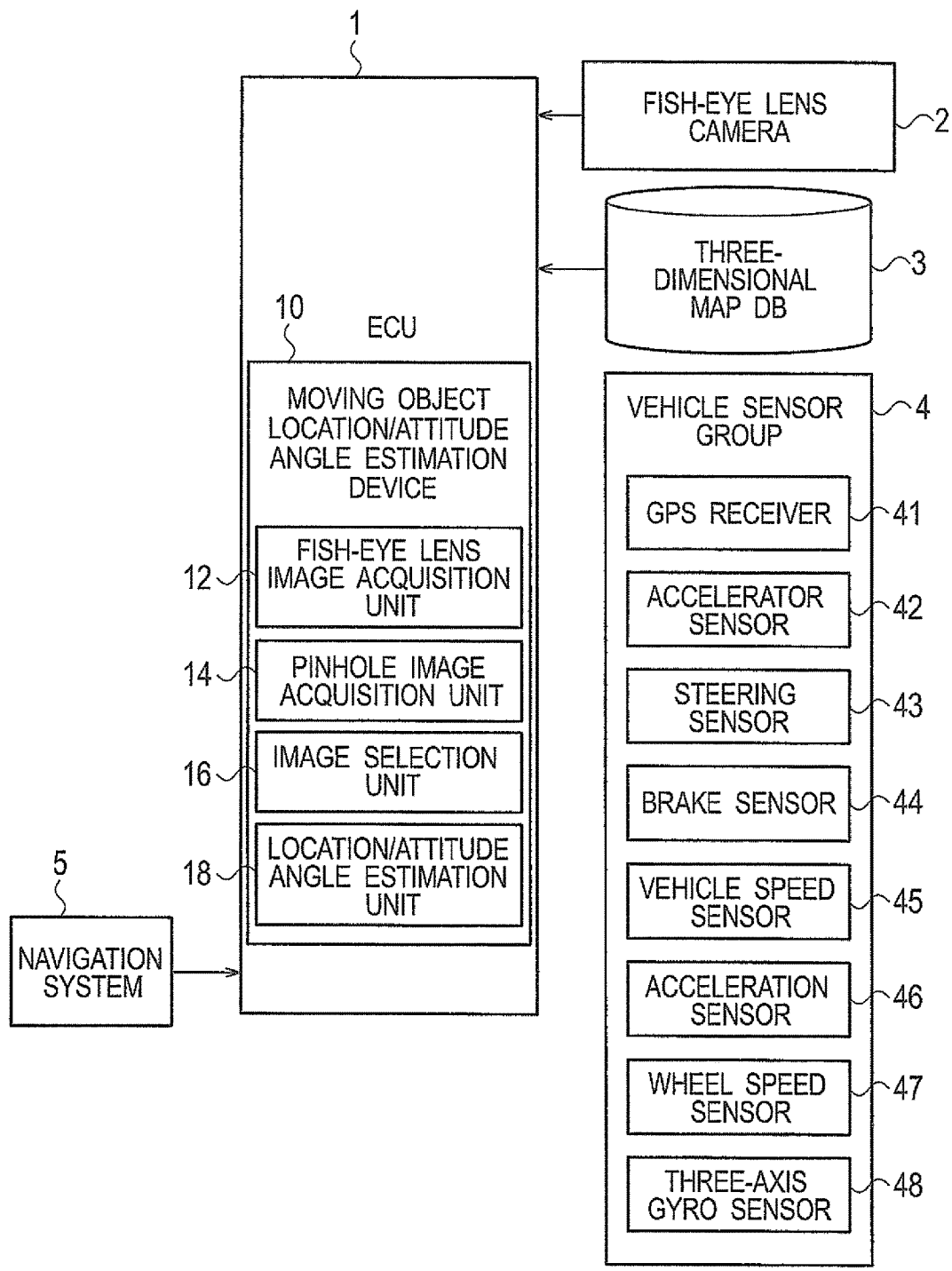
FIG. 1 is a block diagram showing a configuration of a moving object location/attitude angle estimation system including a moving object location/attitude angle estimation device according to a first embodiment to which the present invention is applied.

FIG. 1 is a block diagram showing a configuration of a moving object location/attitude angle estimation system including a moving object location/attitude angle estimation device according to this embodiment. As shown in FIG. 1, the moving object location/attitude angle estimation system according to this embodiment includes an ECU 1, a fish-eye lens camera 2, a three-dimensional map database 3, a vehicle sensor group 4, and a navigation system 5. Note that, in this embodiment, description is given of the case where the moving object location/attitude angle estimation device is applied to a vehicle.

Here, the ECU 1 is an electronic control unit including a ROM, a RAM, an arithmetic circuit and the like, and includes a moving object location/attitude angle estimation device 10 according to this embodiment. Note that the ECU 1 may be used in combination with an ECU to be used for another control.

As the fish-eye lens camera 2, a solid-state image sensing device such as a CCD, for example, is used. In this embodiment, the fish-eye lens camera 2 is installed in such a manner that an optical axis is horizontal to a front bumper of the vehicle, and images of in front of the vehicle can be taken. The taken fish-eye lens image is transmitted to the ECU 1. Also, as for the fish-eye lens, a general equidistant projection type fish-eye lens with a field angle of about 170° may be used.

The three-dimensional map database 3 stores three-dimensional location information such as edges of a surrounding environment including road marking, for example. In this embodiment, the three-dimensional map database 3 stores three-dimensional information on at least locations of compartment lines, curbs and the like indicating road edges, and directions thereof. The three-dimensional information also includes, besides the above, road marking such as white lines, stop lines, crosswalks and road marks as well as edge information of structural objects such as buildings. Note that, as a data format of the three-dimensional map database 3, each piece of map information, such as road edges, is defined as a collection of edges. Since a straight line with long edges is marked off every 1 m, for example, there are no extremely long edges. In the case of a straight line, each edge has three-dimensional location information indicating both endpoints of the straight line. In the case of a curved line, each edge has three-dimensional location information indicating both endpoints and a central point of the curved line.

The vehicle sensor group 4 includes a GPS receiver 41, an accelerator sensor 42, a steering sensor 43, a brake sensor 44, a vehicle speed sensor 45, an acceleration sensor 46, a wheel speed sensor 47, and a three-axis gyro sensor 48. The vehicle sensor group 4 is connected to the ECU 1 and supplies various detection values detected by the respective sensors 41 to 48 to the ECU 1. The ECU 1 uses output values from the vehicle sensor group 4 to calculate an approximate location of the vehicle and to calculate an odometry indicating a travel distance of the vehicle per unit time.

The navigation system 5 may be the same as one mounted on a general vehicle, and includes a database storing road map information recorded with links and nodes. For a destination set by an operation by a driver of the vehicle, a route with optimized driving time, distance and the like is calculated. Then, the calculated route is notified to the driver and transmitted to the ECU 1.

The moving object location/attitude angle estimation device 10 estimates the location and attitude angle of a moving object by matching an image taken of the surrounding environment of the moving object with the three-dimensional map data. The moving object location/attitude angle estimation device 10 operates as a fish-eye lens image acquisition unit 12, a pinhole image acquisition unit 14, an image selection unit 16 and a location/attitude angle estimation unit 18 by executing a moving object location/attitude angle estimation program stored in the ROM.

The fish-eye lens image acquisition unit 12 acquires, from the fish-eye lens camera 2, a fish-eye lens image capturing the surrounding environment of the moving object with the fish-eye lens. The surrounding environment of the moving object is captured in the fish-eye lens image, and at least compartment lines and curbs indicating road edges are also captured therein as road information required to estimate the location and attitude angle of the own vehicle. Besides the above, road marking such as white lines, stop lines, crosswalks and road marks may also be captured in the fish-eye lens image.

The pinhole image acquisition unit 14 acquires a less distorted pinhole image for a predetermined region of the fish-eye lens image. Particularly, in this embodiment, the less distorted pinhole image is acquired by correcting distortion in the predetermined region of the fish-eye lens image taken with the fish-eye lens camera 2. As in the case of the fish-eye lens image, the surrounding environment of the moving object is captured in the pinhole image, and at least compartment lines and curbs indicating road edges are also captured therein as road information required to estimate the location and attitude angle of the own vehicle. Besides the above, road marking such as white lines, stop lines, crosswalks and road marks may also be captured in the pinhole image.

The image selection unit 16 detects a bend degree of a driving road in a travelling direction of the moving object, selects the pinhole image when the detected bend degree is less than a predetermined value, and selects the fish-eye lens image when the bend degree is not less than the predetermined value. Here, the bend degree of the driving road is an index indicating how much the driving road bends. The more the driving road bends, the larger the value of the bend degree. On the other hand, the less the driving road bends, the smaller the value of the bend degree.

Particularly, in this embodiment, a turning radius in the travelling direction of the moving object is detected. When the detected turning radius is larger than a predetermined value, the bend degree is determined to be less than the predetermined value, and the pinhole image is selected. On the other hand, when the turning radius is equal to or less than the predetermined value, the bend degree is determined to be not less than the predetermined value, and the fish-eye lens image is selected.

The location/attitude angle estimation unit 18 estimates the location and attitude angle of the moving object by matching with the three-dimensional map data based on the image selected by the image selection unit 16. Particularly, the location/attitude angle estimation unit 18 estimates the location and attitude angle of the moving object by matching edge information of the selected image with edge information of a virtual image extracted from the three-dimensional map data. In this event, the virtual image contains a virtual location and a virtual attitude angle of a moving object to be estimated. Moreover, the matching with the three-dimensional map data is performed based on the road information indicating the road edges, in particular, in the surrounding environment caught in the selected image.

Note that, while description is given of the case where the present invention is applied to a vehicle in this embodiment, the present invention is also applicable to any other moving objects such as aircraft and ship. When the present invention is applied to aircraft or ship, the location and attitude angle of the moving object may be estimated by matching with landscape or buildings instead of road information about a road as the surrounding environment.

[Procedures of Moving Object Location/Attitude Angle Estimation Processing]

Figure 2:
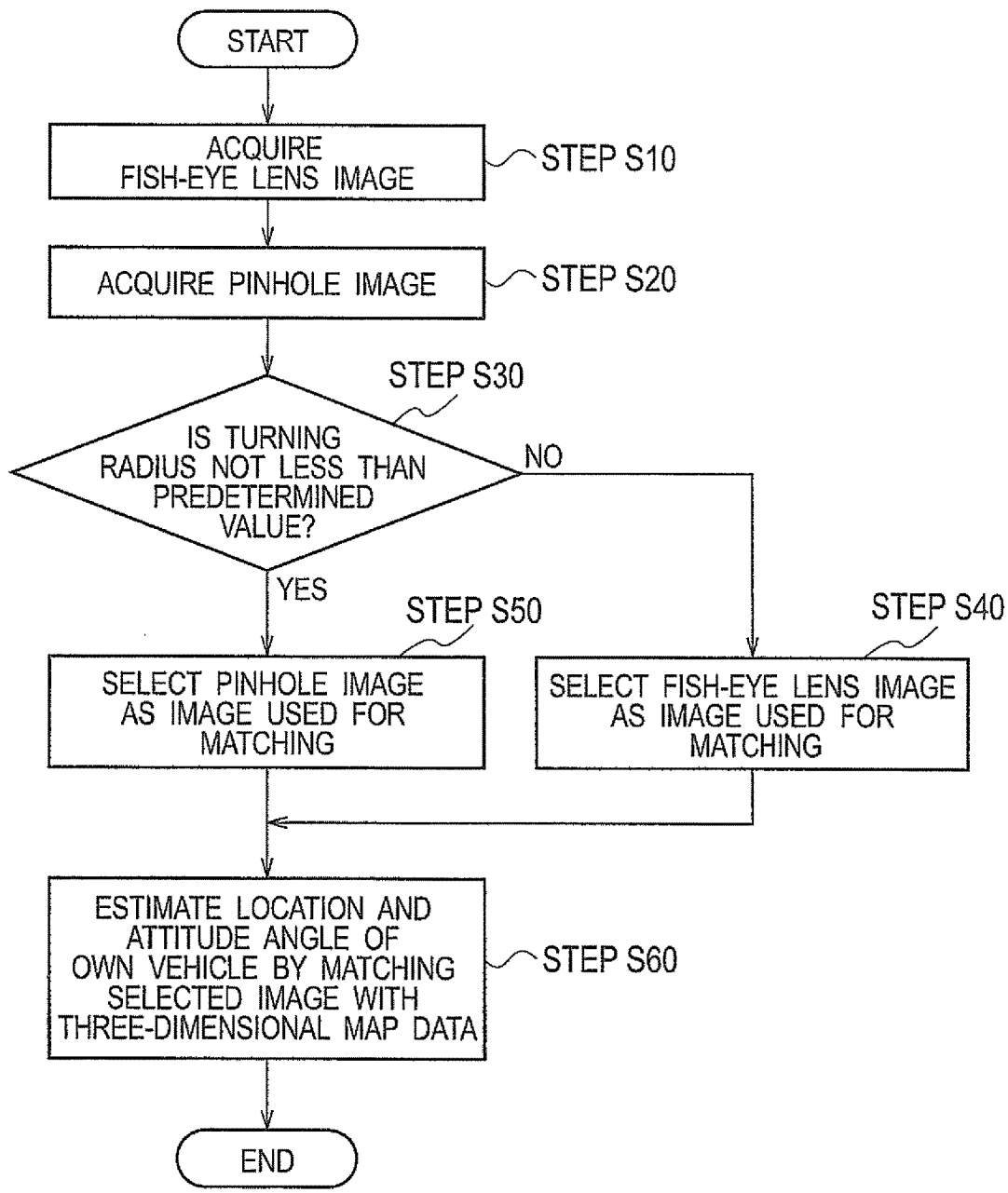
FIG. 2 is a flowchart showing processing procedures of moving object location/attitude angle estimation processing by the moving object location/attitude angle estimation device according to the first embodiment to which the present invention is applied.

Next, with reference to a flowchart of FIG. 2, description is given of procedures of moving object location/attitude angle estimation processing according to this embodiment. Note that, in this embodiment, the location and attitude angle in six degrees of freedom in total are estimated, including the longitudinal direction, lateral direction and vertical direction as location information of the vehicle, and roll, pitch and yaw as attitude angle information. Moreover, the moving object location/attitude angle estimation processing described below is continuously performed at intervals of about 100 msec, for example.

As shown in FIG. 2, first, in Step S10, an image taken with the fish-eye lens camera 2 is transmitted to the ECU 1, and the fish-eye lens image acquisition unit 12 acquires a fish-eye lens image.

Figure 3:
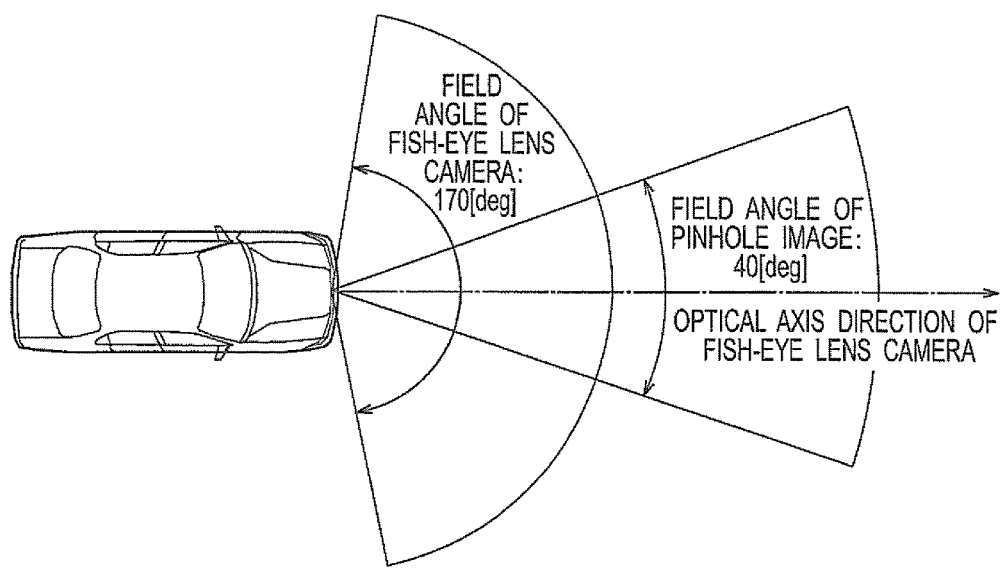
FIG. 3 is a diagram for explaining a field angle of a fish-eye lens camera and a field angle of a pinhole image.

In Step S20, the pinhole image acquisition unit 14 calculates and acquires a less distorted pinhole image by correcting distortion in a predetermined region of the image taken with the fish-eye lens camera 2. Since the fish-eye lens camera 2 has an equidistant projection type fish-eye lens, a virtual spherical model of the fish-eye lens is considered in this embodiment. Thus, the pinhole image is calculated by correcting distortion so as to reproduce a planar screen image that comes into contact with a virtual spherical surface at the intersection with the optical axis. Moreover, the pinhole image is calculated by correcting distortion in a region of field angle of 40° as a predetermined region in the field angle of 170° of the fish-eye lens camera 2 as shown in FIG. 3. In the pinhole image thus calculated, left and right road edges in front of the own vehicle are captured in most driving scenes unless the camera is blocked by an obstacle.

Next, in Step S30, the image selection unit 16 detects a turning radius R [m] in the travelling direction of the own vehicle that is a moving object. In this event, if the turning radius changes, the smallest turning radius is detected as the turning radius R. Then, when the detected turning radius R is larger than a predetermined value Rth [m], a bend degree is determined to be less than a predetermined value, and thus the processing moves to Step S50 to select the pinhole image. On the other hand, when the turning radius R is equal to or less than the predetermined value Rth [m], the bend degree is determined to be not less than the predetermined value, and thus the processing moves to Step S40 to select the fish-eye lens image. Also, ON/OFF of a turn signal may be used to select the image. Note that the predetermined value Rth is set to 30 m in this embodiment.

Here, as a method for detecting the turning radius, the following method may be used. For example, a steering operation by the driver of the own vehicle is detected by the steering sensor 43 in the vehicle sensor group 4, and the detected steering operation is multiplied by a steering gear ratio of a steering mechanism of the own vehicle to obtain a turning angle of a front wheel. Then, a turning radius can be calculated by using a vehicle model such as Ackermann steering geometry and a linear two-wheel model ("Vehicle Dynamics and Control", Chapter 3, Masato Abe, Sankaido). Moreover, referring to the three-dimensional map database 3 from the driving route of the own vehicle calculated by the navigation system 5, the turning radius on the driving route is calculated beforehand and recorded in the ECU 1. Then, the current turning radius R may be obtained from the location and attitude angle of the own vehicle calculated in the last loop.

Meanwhile, in Step S30, not only the image is selected according to the turning radius, but also the processing may proceed to Step S40 to select the fish-eye lens image only when it is determined that the left and right road edges in the travelling direction of the own vehicle cannot be captured in the pinhole image.

In such a case, the interval between the left and right road edges, i.e., the width of road on the driving route is obtained referring to the three-dimensional map database 3. Then, the obtained width of road, the turning radius R, the attachment position of the fish-eye lens camera 2, and the location and attitude angle of the own vehicle calculated by the processing for the last loop are referred to. Based on such information, the image selection unit 16 determines whether or not the left and right road edges in the travelling direction of the own vehicle can be captured in the pinhole image from the current location of the own vehicle. When determining that the road edges cannot be captured, the image selection unit 16 proceeds to Step S40 to select the fish-eye lens image. Accordingly, the pinhole image is selected when the road edges can be captured. Thus, there are more cases where the pinhole image is selected. As a result, the location and attitude angle of the moving object can be estimated quickly in a robust manner.

Once the turning radius is determined in Step S30 as described above, the image selection unit 16 selects, in Step S40, the fish-eye lens image as the image to be used for processing of Step S60 to be described later, and then proceeds to Step S60. When the turning radius is small, i.e., in a scene with a large bend degree, such as a sharp curve and a right or left turn at the intersection, the road edges such as compartment lines and curbs required to calculate the location and attitude angle of the own vehicle are more likely to be not captured in the pinhole image. Therefore, the fish-eye lens image having a wide viewing angle is selected to surely detect the road edges, thereby enabling estimation of the location and attitude angle of the moving object.

Meanwhile, in Step S50, the image selection unit 16 selects the pinhole image as the image to be used for the processing of Step S60 to be described later, and then proceeds to Step S60. When the turning radius is large, i.e., when the bend degree is small, such as a straight road, a gentle curve and going straight down an intersection, the road edges are more likely to be captured even in the pinhole image having a narrow viewing angle. Therefore, the location and attitude angle of the moving object can be estimated using the pinhole image. Moreover, since the pinhole image is less distorted, the location and attitude angle of the moving object can be quickly and accurately estimated.

Next, in Step S60, the location/attitude angle estimation unit 18 estimates the location and attitude angle of the own vehicle by using the image selected in Step S40 or Step S50 to match with the three-dimensional map data. To be more specific, when the fish-eye lens image is selected in Step S40, the location and attitude angle of the moving object are calculated using the flowchart of FIG. 4. On the other hand, when the pinhole image is selected in Step S50, the location and attitude angle of the moving object are calculated using the flowchart of FIG. 5. Once the location and attitude angle of the moving object are thus estimated, the moving object location/attitude angle estimation processing according to this embodiment is terminated.

With reference to the flowcharts of FIGS. 4 and 5, description is given below of procedures of moving object location/attitude angle calculation processing in Step S60.

[Procedures of Moving Object Location/Attitude Angle Calculation Processing when Fish-Eye Lens Image is Selected]

Figure 4:
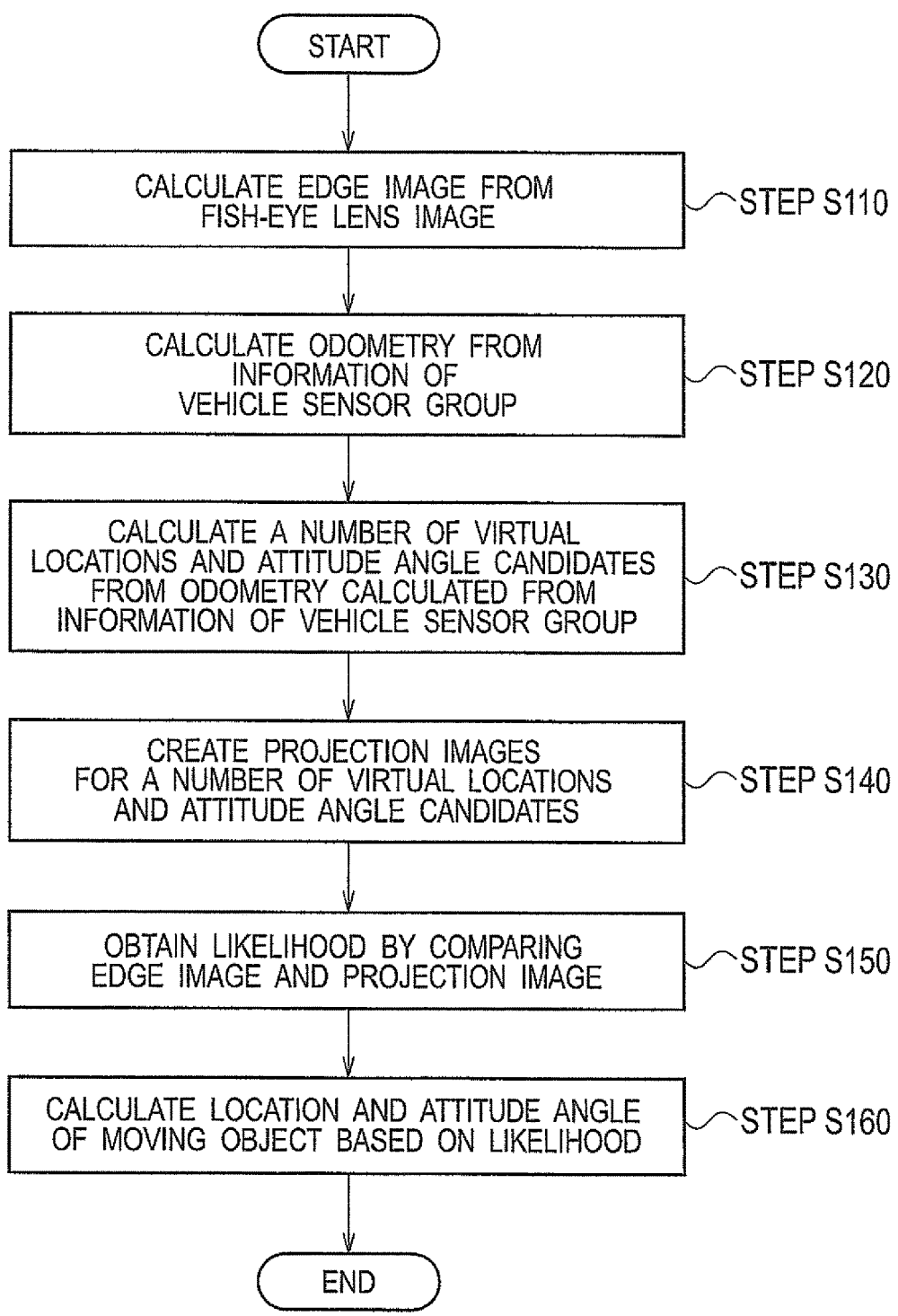
FIG. 4 is a flowchart showing processing procedures of moving object location/attitude angle calculation processing by the moving object location/attitude angle estimation device according to the first embodiment to which the present invention is applied.

First, with reference to the flowchart of FIG. 4, description is given of procedures of moving object location/attitude angle calculation processing when the fish-eye lens image is selected in Step S40.

In Step S110, the location/attitude angle estimation unit 18 calculates an edge image from the fish-eye lens image. The edge in this embodiment means a spot where the brightness of pixels sharply changes. As a method for detecting the edge, the Canny method can be adopted, for example. Besides the Canny method, various other methods, such as differential edge detection, may be used.

Moreover, the location/attitude angle estimation unit 18 preferably extracts a brightness change direction of the edge, colors around the edge, and the like from the fish-eye lens image. Thus, in Steps S150 and S160 to be described later, information on other than the edge recorded in the three-dimensional map database 3 is also used to set a likelihood, thereby enabling the location and attitude angle of the own vehicle to be calculated.

Next, in Step S120, the location/attitude angle estimation unit 18 calculates an odometry that is a travel distance of the vehicle between the point of calculation in Step S120 for the last loop and the current point, based on sensor values obtained from the vehicle sensor group 4. Note that, in the case of the first loop after the program is started, the odometry is set to 0 for calculation.

The location/attitude angle estimation unit 18 uses various sensor values obtained from the vehicle sensor group 4 to calculate the odometry that is a travel distance of the vehicle per unit time. As a method for calculating the odometry, the travel distance and rotation amount per unit time may be calculated from a wheel speed and a yaw rate of each wheel while vehicle movement is limited to on a plane. Alternatively, a vehicle speed or a difference between positioning values obtained by the GPS receiver 41 may be used in place of the wheel speed, and a steering angle may be used in place of the yaw rate. Note that, as the method for calculating the odometry, various calculation methods are conceivable, and any method may be used as long as the odometry can be calculated.

Next, in Step S130, the location/attitude angle estimation unit 18 moves the vehicle location for the odometry calculated this time in Step S120 from the vehicle location estimated in Step S160 for the last loop. Then, a number of candidates for a virtual location and a virtual attitude angle are calculated around the moved vehicle location. The candidates for the virtual location and virtual attitude angle are candidates for the location and attitude angle of the own vehicle. However, in the case of the first loop after the program is started, there is no previous vehicle location information. Therefore, data from the GPS receiver 41 included in the vehicle sensor group 4 is used as initial location information. Alternatively, the location and attitude angle of the vehicle last calculated last time the vehicle is stopped may be stored and used as the initial location and attitude angle information.

In this event, the location/attitude angle estimation unit 18 creates the multiple candidates for the virtual location and virtual attitude angle, which are likely to be true values of the location and attitude angle of the vehicle, while taking into consideration a measurement error of the vehicle sensor group 4, an error in odometry caused by a communication delay, and vehicle dynamic characteristics that cannot be calculated with the odometry. Such candidates for the virtual location and virtual attitude angle are randomly set by setting upper and lower limits of errors for six degrees of freedom parameters of the location and attitude angle, and using a random number table or the like within the range of the upper and lower limits of the errors.

Note that, in this embodiment, 500 candidates are created for the virtual location and virtual attitude angle. Moreover, as for the upper and lower limits of errors for the six degrees of freedom parameters of the location and attitude angle, ±0.05 [m], ±0.05 [m], ±0.05 [m], ±0.5°, ±0.5°, ±0.5° are set, respectively, for the longitudinal direction, lateral direction, vertical direction, roll, pitch and yaw. It is preferable that the number of candidates to be created for the virtual location and virtual attitude angle and the upper and lower limits of errors for the six degrees of freedom parameters of the location and attitude angle are appropriately changed by detecting or estimating a vehicle driving state or road surface conditions. For example, when a sharp turn, a skid or the like occurs, errors in a planar direction (longitudinal direction, lateral direction and yaw) are likely to be increased. Thus, it is preferable to increase the upper and lower limits of errors for the three parameters and to increase the number of candidates to be created for the virtual location and virtual attitude angle.

Alternatively, in Step S130, the location/attitude angle estimation unit 18 may use a so-called particle filter to set the candidates for the virtual location and virtual attitude angle. In this case, the location/attitude angle estimation unit 18 calculates the candidates for the virtual location and virtual attitude angle this time by moving locations and attitude angles of particles (candidate points), which are the candidates for the virtual location and virtual attitude angle created in Step S160 for the last loop, for the odometry. More specifically, the locations and attitude angles of the particles are set as the candidates for the virtual location and virtual attitude angle. Note that it is even better to take into consideration the measurement error of the vehicle sensor group 4, the error in odometry caused by a communication delay, and the vehicle dynamic characteristics that cannot be calculated with the odometry. In this case, after the location information and attitude angle information of the particles are moved for the odometry, the candidates for the virtual location and virtual attitude angle are randomly changed using the random number table or the like within the range of the upper and lower limits of the errors for the six degrees of freedom parameters of the location and attitude angle as described above.

However, in the case of the first loop after the program is started, each particle has no location information or attitude angle information. Therefore, detection data from the GPS receiver 41 included in the vehicle sensor group 4 may be used as initial location information. Alternatively, the location information and attitude angle information of each particle may be set based on the vehicle location last estimated last time the vehicle is stopped. In this embodiment, in the case of the first loop, the upper and lower limits of the errors for the six degrees of freedom parameters of the location and attitude angle are set based on the vehicle location last estimated last time the vehicle is stopped. Then, the locations and attitude angles of the particles are randomly set using the random number table or the like within the range of the upper and lower limits of the errors. In this embodiment, 500 particles are created in the case of the first loop. Moreover, as for the upper and lower limits of errors for the six degrees of freedom parameters for the particles, ±0.05 [m], ±0.05 [m], ±0.05 [m], ±0.5°, ±0.5°, ±0.5° are set, respectively, for the longitudinal direction, lateral direction, vertical direction, roll, pitch and yaw.

Next, in Step S140, the location/attitude angle estimation unit 18 creates projection images (virtual images) for the respective candidates for the virtual location and virtual attitude angle created in Step S130. In this event, the three-dimensional location information on the edge and the like stored in the three-dimensional map database 3, for example, is projection-converted into a camera image taken with the fish-eye lens from the virtual location and the virtual attitude angle, thereby creating the projection image. The projection image is an evaluation image for evaluating if each of the candidates for the virtual location and virtual attitude angle coincides with the actual location and attitude angle of the own vehicle. Moreover, the projection conversion requires an external parameter indicating the location of the fish-eye lens camera 2 and an internal parameter of the fish-eye lens camera 2. The external parameter may be calculated from the candidates for the virtual location and virtual attitude angle by measuring beforehand a relative location between the vehicle location (e.g., a central position) and the fish-eye lens camera 2. The internal parameter may be obtained by calibration beforehand.

Note that, if the brightness change direction of the edge, the colors around the edge, and the like are extracted from the fish-eye lens image in Step S110, the projection image is preferably created using such information.

Next, in Step S150, the location/attitude angle estimation unit 18 compares the edge image created in Step S110 with the edge information of the projection image created in Step S140 for each of the candidates for the virtual location and virtual attitude angle set in Step S130. Then, based on the result of the comparison, likelihood is obtained for each of the candidates for the virtual location and virtual attitude angle. The likelihood is an index indicating how much the candidates for the virtual location and virtual attitude angle are likely to be the actual location and attitude angle of the vehicle. The location/attitude angle estimation unit 18 sets the likelihood such that the higher the degree of coincidence between the projection image and the edge image, the higher the likelihood. An example of how to obtain the likelihood is described below.

First, a pixel position is specified on the projection image, and it is determined whether or not there is an edge in the pixel position. Then, it is determined whether or not there is an edge in a position on the edge image to be the same pixel position as that on the projection image. The likelihood (unit: none) is set to 1 if the presence or absence of the edge coincides, and is set to 0 if not. Such processing is performed for all the pixels on the projection image, and the likelihoods set for all the pixel positions are added up to obtain a final likelihood for the candidate for the virtual location and virtual attitude angle. Then, once the likelihoods are calculated for all the candidates for the virtual location and virtual attitude angle, the likelihoods are normalized such that a total value of the likelihoods is 1.

Next, in Step S160, the location/attitude angle estimation unit 18 calculates final location and attitude angle of the own vehicle by using the candidates for the virtual location and virtual attitude angle with the likelihood information calculated in Step S150. For example, the location/attitude angle estimation unit 18 sets the candidate for the virtual location and virtual attitude angle with the highest likelihood as the actual location and attitude angle of the vehicle. Moreover, the likelihoods of the respective candidates for the virtual location and virtual attitude angle are used to obtain a weighted mean of the virtual location and virtual attitude angle, and the obtained value may be used as the final location and attitude angle of the own vehicle. Furthermore, in Step S160, resampling of the particles is performed based on the likelihood of each candidate for the virtual location and virtual attitude angle. Once the location and attitude angle of the own vehicle are thus calculated, the moving object location/attitude angle calculation processing according to this embodiment is terminated. Then, the calculated location and attitude angle of the own vehicle are outputted as the estimation result in Step S60 of FIG. 2.

[Procedures of Moving Object Location/Attitude Angle Calculation Processing when Pinhole Image is Selected]

Figure 5:
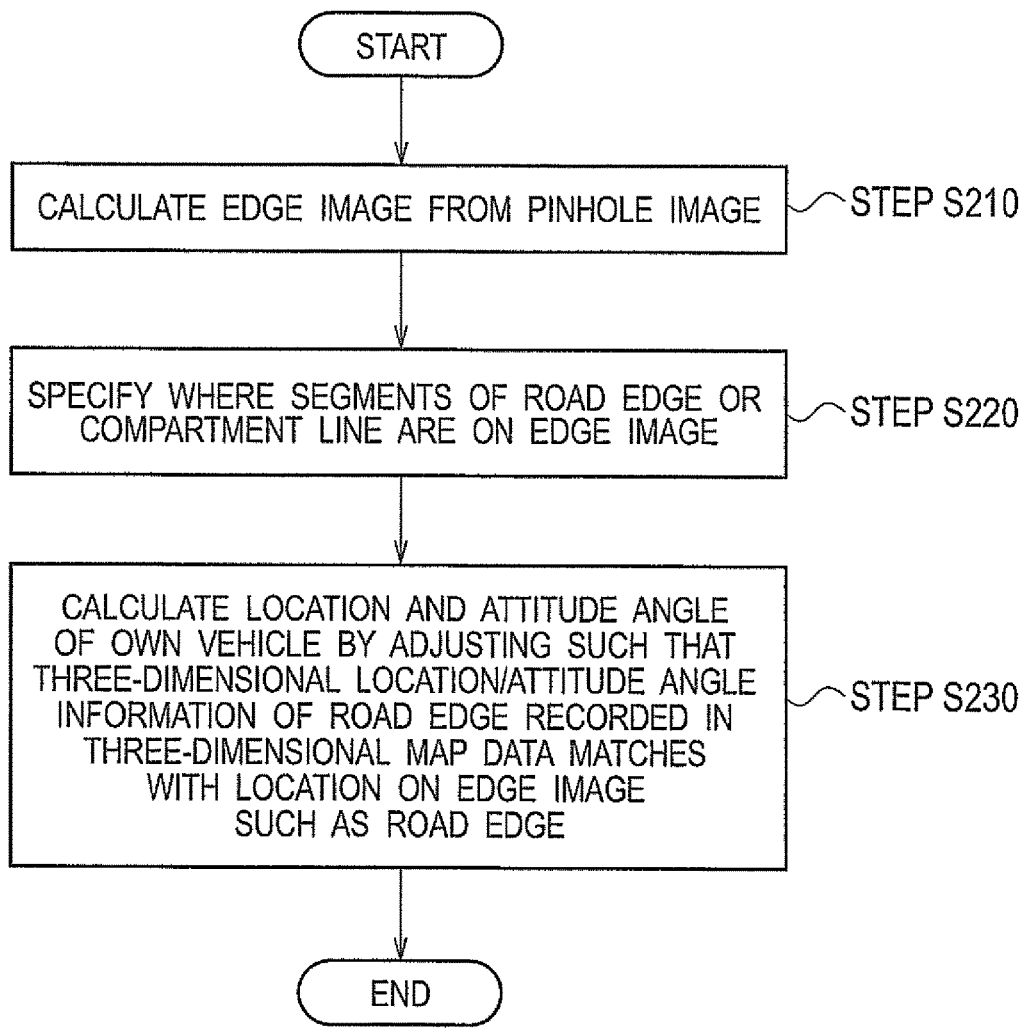
FIG. 5 is a flowchart showing processing procedures of the moving object location/attitude angle calculation processing by the moving object location/attitude angle estimation device according to the first embodiment to which the present invention is applied.

Next, with reference to the flowchart of FIG. 5, description is given of procedures of moving object location/attitude angle calculation processing when the pinhole image is selected in Step S50 of FIG. 2.

In Step S210, the location/attitude angle estimation unit 18 calculates an edge image from the pinhole image in the same manner as in Step S110 of FIG. 4 described above.

Next, in Step S220, the location/attitude angle estimation unit 18 performs Hough transform or the like on the edge image calculated in Step S210 to specify where on the edge image the segments of the road edges or compartment line exist. Note that, when the three-dimensional map database 3 includes road marking such as stop lines, crosswalks and road marks as well as edge information of structural objects such as buildings, the location/attitude angle estimation unit 18 also specifies where on the edge image these segments exist.

Next, in Step S230, the location/attitude angle estimation unit 18 calculates the location and attitude angle of the own vehicle by adjusting such that the three-dimensional location and attitude angle information of the road edges recorded in the three-dimensional map DB 3 matches with the location on the edge image such as the road edges specified in Step S220.

To be more specific, the three-dimensional map data recorded in the three-dimensional map database 3 is projected through a camera model of the pinhole image, and the projected three-dimensional location and attitude angle of the road edges are adjusted so as to match with the road edges specified on the edge image. Then, if there are road edges in the three-dimensional map data, which coincide with the road edges specified on the edge image, three-dimensional location and attitude angle of the road edges are calculated as the location and attitude angle of the own vehicle.

Note that, in Step S230, it is even better to narrow down the location of the own vehicle using information from the GPS receiver 41 in the vehicle sensor group 4, for example, and then make an adjustment such that the road edges specified on the edge image match with the road edges in the projected three-dimensional map data.

As a method for narrowing down the location of the own vehicle, true values of the current location and attitude angle of the own vehicle may be obtained around a location obtained by moving the location and attitude angle of the own vehicle, which are calculated in Step S60 of FIG. 2 for the last loop, for the odometry calculated by the method used in Step S130 of FIG. 4.

Once the location and attitude angle of the own vehicle are thus calculated, the moving object location/attitude angle calculation processing according to this embodiment is terminated. Then, the calculated location and attitude angle of the own vehicle are outputted as the estimation result in Step S60 of FIG. 2.

Effects of First Embodiment

As described in detail above, the moving object location/attitude angle estimation device according to this embodiment estimates the location and attitude angle of the moving object based on the fish-eye lens image taken of the surrounding environment of the moving object with the fish-eye lens or the pinhole image taken of a predetermined region of the fish-eye lens image. Thus, the location and attitude angle of the moving object can be estimated from the surrounding environment of the moving object without a specific device such as a traffic light.

Also, the moving object location/attitude angle estimation device according to this embodiment detects the turning radius in the travelling direction of the moving object, and selects the pinhole image by determining that the bend degree is less than the predetermined value when the detected turning radius is larger than the predetermined value. On the other hand, the moving object location/attitude angle estimation device according to this embodiment selects the fish-eye lens image by determining that the bend degree is not less than the predetermined value when the turning radius is equal to or less than the predetermined value. Thus, even in a scene such as a sharp curve and a right or left turn at the intersection, the location and attitude angle of the moving object can be estimated using the fish-eye lens image with a wide viewing angle. On the other hand, in such a case as a straight road, a gentle curve and going straight down an intersection, the location and attitude angle of the moving object can be quickly and accurately estimated using the pinhole image.

Moreover, the moving object location/attitude angle estimation device according to this embodiment acquires a less distorted pinhole image by correcting distortion in the predetermined region of the fish-eye lens image. Thus, the pinhole image can be acquired without installing a pinhole camera. As a result, cost can be significantly reduced.

Furthermore, the moving object location/attitude angle estimation device according to this embodiment selects the fish-eye lens image only when determining that the left and right road edges in the travelling direction of the moving object cannot be captured in the pinhole image. Accordingly, the pinhole image can be selected when the road edges can be captured. Thus, there are more cases where the pinhole image is selected. As a result, the location and attitude angle of the moving object can be estimated quickly in a robust manner.

Second Embodiment

Next, with reference to the drawings, description is given of a moving object location/attitude angle estimation device according to a second embodiment of the present invention. Note that the moving object location/attitude angle estimation device according to this embodiment has the same configuration as that of the first embodiment, and thus detailed description thereof is omitted.

[Procedures of Moving Object Location/Attitude Angle Estimation Processing]

Figure 6:
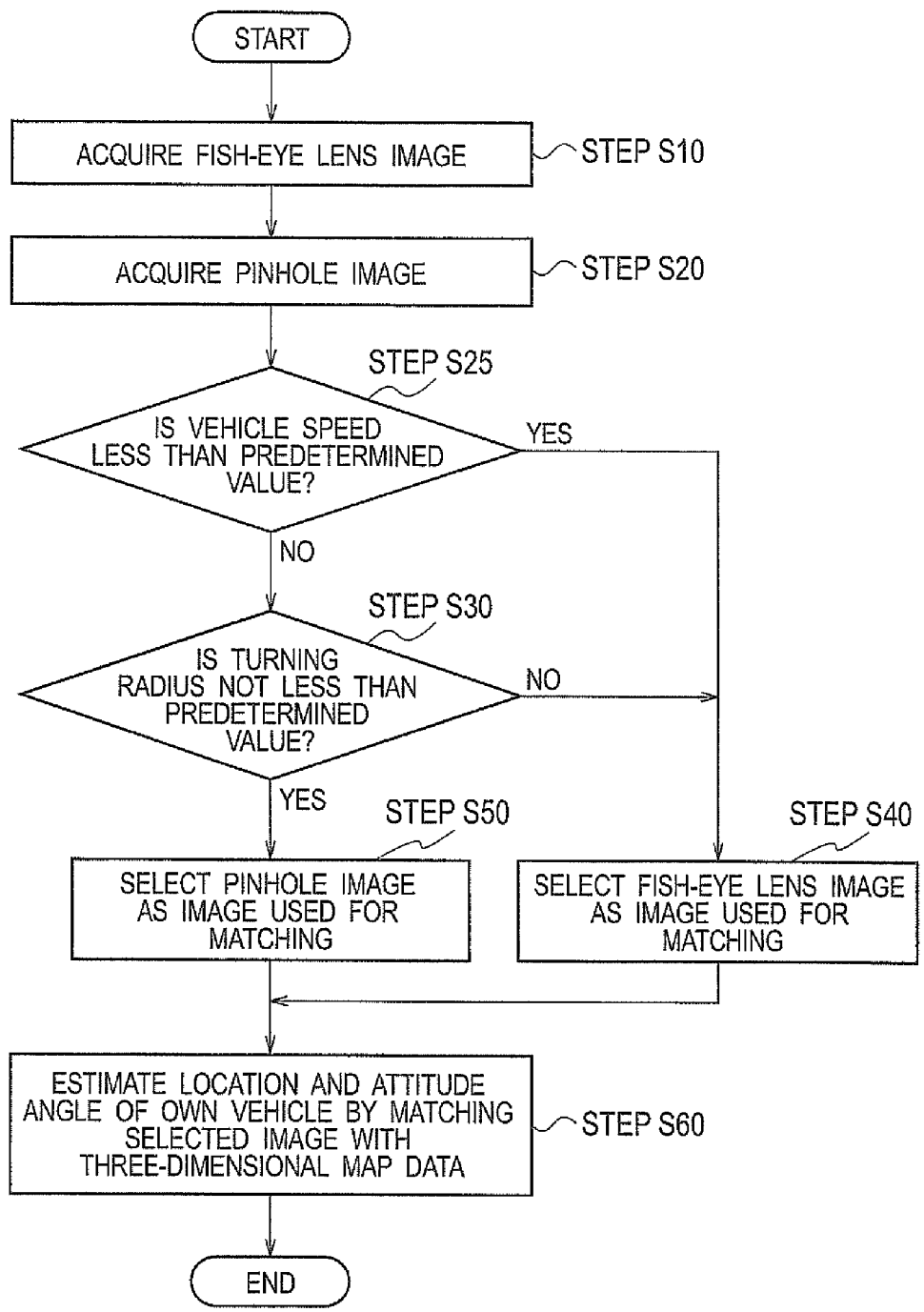
FIG. 6 is a flowchart showing processing procedures of moving object location/attitude angle estimation processing by a moving object location/attitude angle estimation device according to a second embodiment to which the present invention is applied.

Next, with reference to a flowchart of FIG. 6, description is given of procedures of moving object location/attitude angle estimation processing according to this embodiment. This embodiment is different from the first embodiment in including Step S25 of determining whether or not the vehicle speed of the own vehicle is less than a predetermined value.

In Step S25, the image selection unit 16 determines whether or not a travel speed of the own vehicle is less than a predetermined value, based on vehicle speed information acquired by the vehicle speed sensor 45 in the vehicle sensor group 4. In this embodiment, it is determined whether or not the vehicle speed is less than 30 [km/h] as the predetermined value. Then, if the vehicle speed is less than 30 [km/h], the processing advances to Step S40 to select a fish-eye lens image, regardless of a turning radius in the travelling direction of the own vehicle. More specifically, the processing advances to Step S40 without carrying out the processing of Step S30. On the other hand, if the vehicle speed is not less than 30 [km/h], the processing advances to Step S30.

In this embodiment, when the travel speed of the own vehicle is low and there is less need to estimate the location and attitude angle of the moving object at a high frequency, the location and attitude angle of the moving object are estimated using the fish-eye lens image.

Effects of Second Embodiment

As described in detail above, the moving object location/attitude angle estimation device according to this embodiment selects the fish-eye lens image when the travel speed of the moving object is less than the predetermined value. In general, in a traffic jam, at an intersection or the like where vehicles run at low speed, if the viewing angle is narrow such as the pinhole image, there is a high possibility that the road edges cannot be captured due to blockage by an obstacle. Therefore, when the travel speed is less than the predetermined value, the location and attitude angle of the moving object can be estimated in a robust manner by using the fish-eye lens image in which the road edges are likely to be captured.

Third Embodiment

Next, with reference to the drawings, description is given of a moving object location/attitude angle estimation device according to a third embodiment of the present invention. Note that the moving object location/attitude angle estimation device according to this embodiment has the same configuration as that of the first embodiment, and thus detailed description thereof is omitted. Also, this embodiment can be applied to not only the first embodiment but also the second embodiment.

[Procedures of Moving Object Location/Attitude Angle Estimation Processing]

Figure 7:
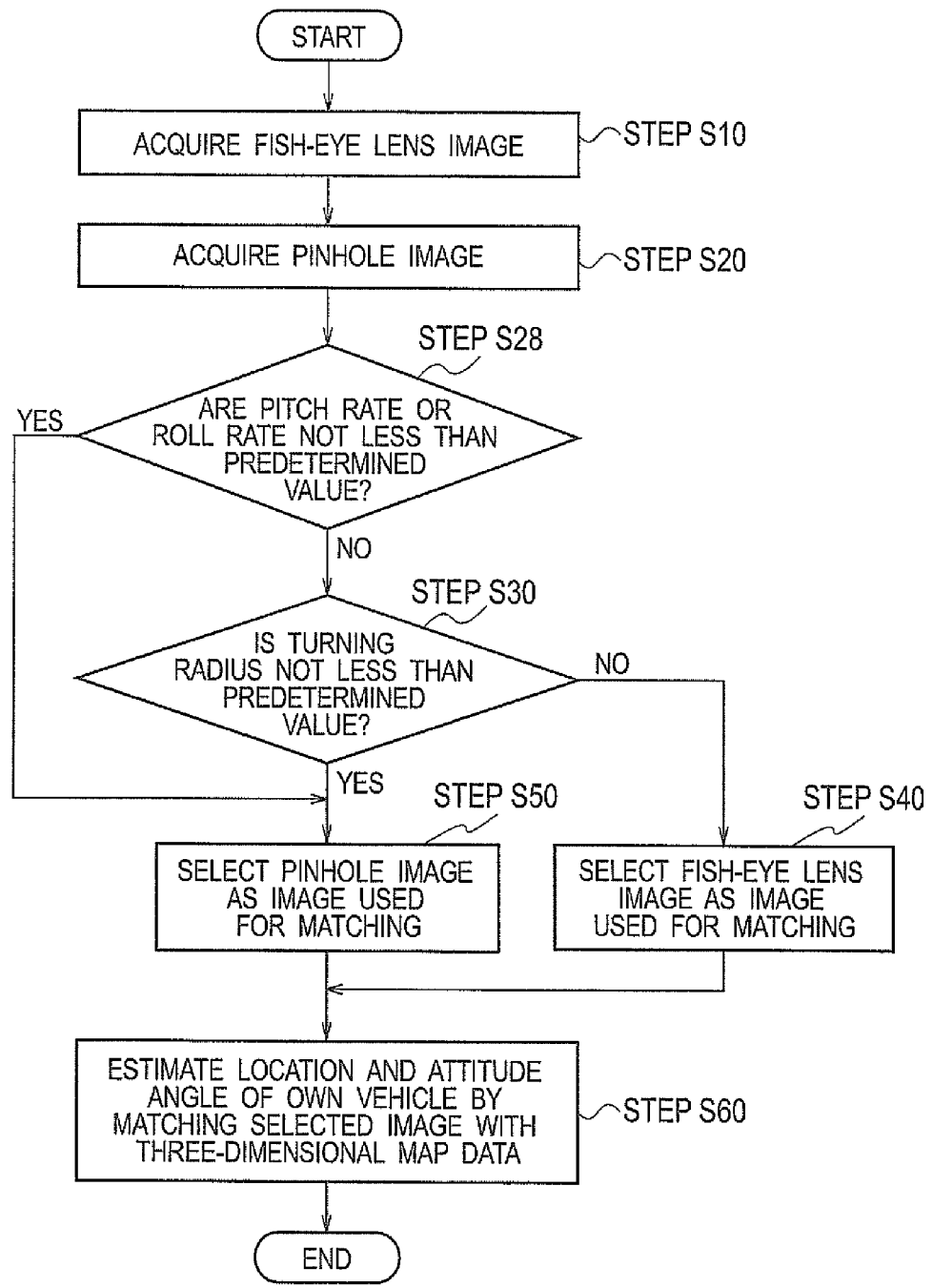
FIG. 7 is a flowchart showing processing procedures of moving object location/attitude angle estimation processing by a moving object location/attitude angle estimation device according to a third embodiment to which the present invention is applied.

Next, with reference to a flowchart of FIG. 7, description is given of procedures of moving object location/attitude angle estimation processing according to this embodiment. This embodiment is different from the first embodiment in including Step S28 of determining whether or not a pitch rate or a roll rate of the own vehicle is not less than a predetermined value.

In Step S28, the image selection unit 16 determines whether or not a pitch rate or a roll rate acquired by the three-axis gyro sensor 48 in the vehicle sensor group 4 is not less than a predetermined value. In this embodiment, it is determined whether or not the pitch rate or roll rate is not less than 3 [deg/s] as the predetermined value. Then, if the pitch rate or roll rate is not less than 3 [deg/s], the processing advances to Step S50 to select a pinhole image, regardless of a turning radius in the travelling direction of the own vehicle. More specifically, the processing advances to Step S50 without carrying out the processing of Step S30. On the other hand, if the pitch rate or roll rate is less than 3 [deg/s], the processing advances to Step S30.

In this embodiment, when a time rate of change in a pitch angle or a roll angle of the own vehicle is large, e.g., when the vehicle runs on a bumpy road, the location and attitude angle of the own vehicle are estimated using the pinhole image. When the time rate of change in the pitch angle or roll angle is large, the point of view of the camera vibrates. As a result, the road edges captured in the fish-eye lens image with large lens distortion are moved in a vibrating manner, and the shape thereof keeps constantly changing. This complicates matching with the three-dimensional map data, leading to increased computational load. Therefore, in such a scene, the location and attitude angle of the moving object are estimated using the pinhole image.

Effects of Third Embodiment

As described in detail above, the moving object location/attitude angle estimation device according to this embodiment selects the pinhole image when the time rate of change in the pitch angle of the moving object is not less than the predetermined value. Thus, even if the camera vibrates due to bumps, steps or the like in the road, the less distorted pinhole image can be used. As a result, the location and attitude angle of the moving object can be estimated more quickly in a robust manner.

Moreover, the moving object location/attitude angle estimation device according to this embodiment selects the pinhole image when the time rate of change in the roll angle of the moving object is not less than the predetermined value. Thus, even if the camera vibrates due to bumps, steps or the like in the road, the less distorted pinhole image can be used. As a result, the location and attitude angle of the moving object can be estimated more quickly in a robust manner.

Fourth Embodiment

Next, with reference to the drawings, description is given of a moving object location/attitude angle estimation device according to a fourth embodiment of the present invention. Note that the moving object location/attitude angle estimation device according to this embodiment has the same configuration as that of the first embodiment, and thus detailed description thereof is omitted.

However, an image selection unit 16 according to this embodiment determines whether or not the surrounding environment of the moving object is blocked, based on the pinhole image acquired by the pinhole image acquisition unit 14. When the surrounding environment is blocked, a bend degree is determined to be not less than a predetermined value, and a fish-eye lens image is selected. On the other hand, when the surrounding environment is not blocked, the bend degree is determined to be less than the predetermined value, and a pinhole image is selected.

[Procedures of Moving Object Location/Attitude Angle Estimation Processing]

Figure 8:
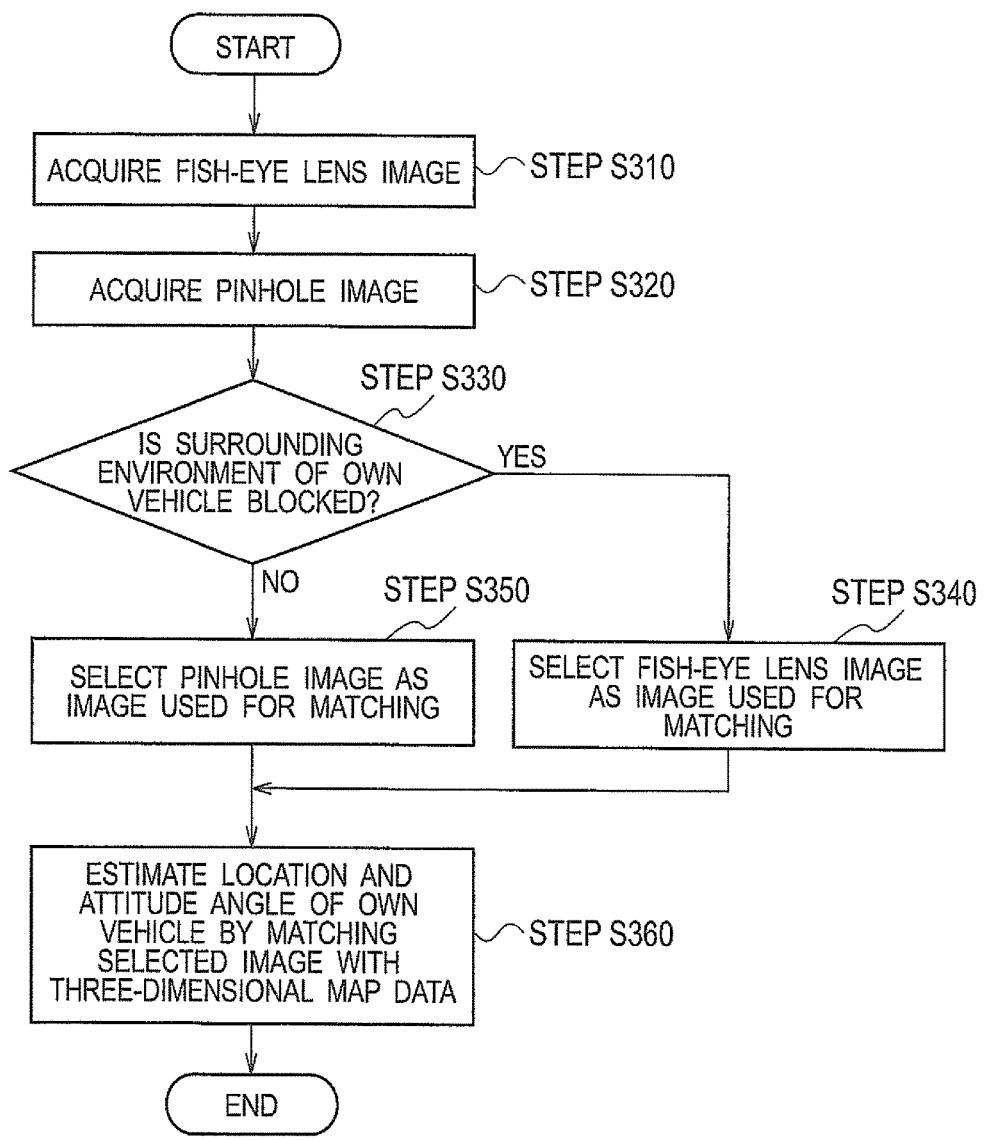
FIG. 8 is a flowchart showing processing procedures of moving object location/attitude angle estimation processing by a moving object location/attitude angle estimation device according to a fourth embodiment to which the present invention is applied.

Next, with reference to a flowchart of FIG. 8, description is given of procedures of moving object location/attitude angle estimation processing according to this embodiment. This embodiment is different from the first embodiment in determining in Step S330 whether or not the surrounding environment of the own vehicle is blocked.

As shown in FIG. 8, in Steps S310 and S320, a pinhole image is acquired by executing the same processing as that in Steps S10 and S20 shown in FIG. 2.

In Step S330, the image selection unit 16 determines whether or not the surrounding environment of the own vehicle that is the moving object is blocked, based on the pinhole image acquired in Step S320. As a method for determining whether or not the surrounding environment is blocked, the following method is adopted.

First, a brightness average of all pixels in the pinhole image is obtained. When the brightness average value is not less than a threshold THmax (unit: none) or not more than a threshold THmin (unit: none), the surrounding environment is determined to be blocked. This is because of the following reason. Specifically, an image with an extremely large brightness average is a too bright image as if sunlight is directly captured. On the other hand, an image with an extremely small brightness average is an image in a blocked state as if darkness is captured. For such images, it is difficult to extract characteristic points of images by edge extraction performed to estimate the location and attitude angle of the moving object to be described later. Therefore, it is difficult to make an adjustment so as to match with the three-dimensional map data. Thus, it is required to increase the viewing angle, and to switch to the fish-eye lens image rather than the pinhole image. Note that, in this embodiment, the brightness value in recording the extracted image in the ECU 1 is within a range of 0 to 255 (0: darkest, 255: brightest). THmax is set to 240, and THmin is set to 15.

Moreover, as another determination method, the location and shape of an obstacle, such as a vehicle and a pedestrian, that is present around the own vehicle may be detected, and it may be determined whether or not the far side of the obstacle is blocked in an image of a direction in which the obstacle is located. As a method for detecting the obstacle, the obstacle may be detected by additionally mounting a laser range finder on the own vehicle or a motion stereo using a camera image. In this embodiment, based on the location and shape of the obstacle and the location and attitude angle of the vehicle estimated in the last loop, in how many percent of the pixels in the pinhole image the obstacle is captured is estimated. When it is estimated that the obstacle is captured in 50% or more of the pinhole image, it is determined to be impossible to look into the distance. Accordingly, the surrounding environment is determined to be blocked.

Furthermore, as another determination method, it may be determined whether or not the surrounding environment is blocked, by extracting a place where a gradient of a road or a horizon plane is convex upward ahead of the vehicle, based on the three-dimensional map and the location and attitude angle of the vehicle estimated in the last loop. In this embodiment, a criterion for determining that the gradient is convex upward is that a gradient change amount is not less than 2° per unit length (1 m) in a direction away from the vehicle. Moreover, the surrounding environment is determined to be blocked also when an upward convex place is within 10 [m] from the fish-eye lens camera 2.

Moreover, in performing the determination method described above, when the left and right road edges in the travelling direction of the moving object are not blocked in the pinhole image, the surrounding environment may be determined to be not blocked. In other words, the surrounding environment is determined to be not blocked as long as the road edges such as compartment lines and curbs can be detected even if most of the pinhole image is blocked. For example, when only the upper half of the pinhole image, i.e., only a region that is mostly not a road surface is blocked, the surrounding environment is determined to be not blocked. Moreover, binarization or the like may be performed on the pinhole image to detect a white line portion, and when white lines can be detected, the surrounding environment may be determined to be not blocked.

On the other hand, even if only a part of the surrounding environment is blocked, when the road edges such as compartment lines and curbs are blocked, the surrounding environment may be determined to be blocked. For example, when the lower half of the pinhole image, i.e., a region in which mostly the road surface is captured is blocked, the surrounding environment is determined to be blocked. Moreover, binarization or the like may be performed on the pinhole image to detect a white line portion, and when no white lines can be detected, the surrounding environment may be determined to be blocked.

By using the determination method described above, the image selection unit 16 determines whether or not the surrounding environment of the own vehicle is blocked. When the surrounding environment is blocked, the bend degree is determined to be not less than a predetermined value, and the processing advances to Step S340. On the other hand, when the surrounding environment is not blocked, the bend degree is determined to be less than the predetermined value, and the processing advances to Step S350.

In Step S340, the image selection unit 16 selects a fish-eye lens image as an image to be used for processing in Step S360 to be described later, and then proceeds to Step S360. Normally, the road edges such as compartment lines and curbs are likely to be blocked by a light environment or the like, such as shadows created by obstacles such as other vehicles, besides when the bend degree of the driving road is large. However, the use of the fish-eye lens image with a wide viewing angle makes it more likely for the road edges to be captured. Therefore, when the surrounding environment is determined to be blocked, the fish-eye lens image is selected to surely detect the road edges, thereby estimating the location and attitude angle of the moving object.

In Step S350, the image selection unit 16 selects a pinhole image as an image to be used for processing in Step S360 to be described later, and then proceeds to Step S360. Since the pinhole image is less distorted, the use of the pinhole image makes it possible to more quickly and accurately estimate the location and attitude angle of the moving object. Therefore, when the surrounding environment is determined to be not blocked, the pinhole image is used.

Once either one of the fish-eye lens image and the pinhole image is thus selected by the image selection unit 16, the same processing as that in Step S60 of FIG. 2 is executed in Step S360. Then, the moving object location/attitude angle estimation processing according to this embodiment is terminated.

Effects of Fourth Embodiment

As described in detail above, the moving object location/attitude angle estimation device according to this embodiment determines whether or not the surrounding environment of the moving object is blocked. When the surrounding environment is blocked, the bend degree is determined to be not less than the predetermined value, and the fish-eye lens image is selected. On the other hand, when the surrounding environment is not blocked, the bend degree is determined to be less than the predetermined value, and the pinhole image is selected. Thus, even when the surrounding environment is blocked, the location and attitude angle of the moving object can be estimated using the fish-eye lens image with a wide viewing angle. On the other hand, when the surrounding environment is not blocked, the location and attitude angle of the moving object can be quickly and accurately estimated using the pinhole image.

Moreover, the moving object location/attitude angle estimation device according to this embodiment acquires a less distorted pinhole image by correcting distortion in the predetermined region of the fish-eye lens image. Thus, the pinhole image can be acquired without installing a pinhole camera. As a result, cost can be significantly reduced.

Furthermore, the moving object location/attitude angle estimation device according to this embodiment selects the pinhole image by determining that the bend degree is less than the predetermined value when the left and right road edges in the travelling direction of the moving object are not blocked. Accordingly, the pinhole image can be selected as long as the road edges are not blocked. Thus, there are more cases where the pinhole image is selected. As a result, the location and attitude angle of the moving object can be estimated more quickly in a robust manner.

Fifth Embodiment

Next, with reference to the drawings, description is given of a moving object location/attitude angle estimation device according to a fifth embodiment of the present invention. Note that the moving object location/attitude angle estimation device according to this embodiment has the same configuration as that of the fourth embodiment, and thus detailed description thereof is omitted.

[Procedures of Moving Object Location/Attitude Angle Estimation Processing]

Figure 9:
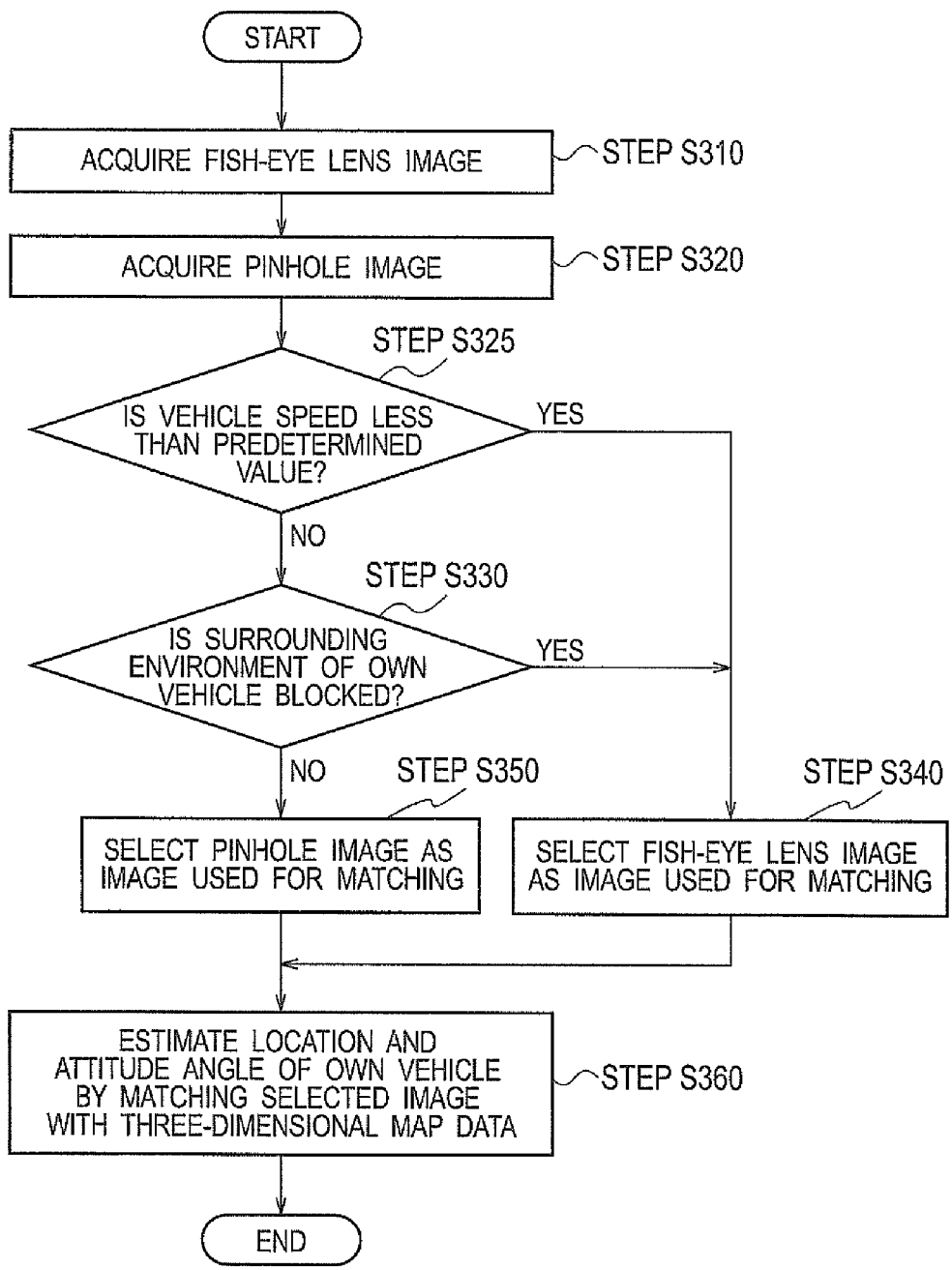
FIG. 9 is a flowchart showing processing procedures of moving object location/attitude angle estimation processing by a moving object location/attitude angle estimation device according to a fifth embodiment to which the present invention is applied.

Next, with reference to a flowchart of FIG. 9, description is given of procedures of moving object location/attitude angle estimation processing according to this embodiment. This embodiment is different from the fourth embodiment in including Step S325 of determining whether or not the vehicle speed of the own vehicle is less than a predetermined value.

In Step S325, the image selection unit 16 determines whether or not a travel speed of the own vehicle is less than a predetermined value, based on vehicle speed information acquired by the vehicle speed sensor 45 in the vehicle sensor group 4. In this embodiment, it is determined whether or not the vehicle speed is less than 30 [km/h] as the predetermined value. Then, if the vehicle speed is less than 30 [km/h], the processing advances to Step S340 regardless of whether or not the pinhole image acquired in Step S320 is blocked. More specifically, the processing advances to Step S340 without carrying out the processing of Step S330. On the other hand, if the vehicle speed is not less than 30 [km/h], the processing advances to Step S330.

In this embodiment, when the travel speed of the own vehicle is low and there is less need to estimate the location and attitude angle of the moving object at a high frequency, the location and attitude angle of the moving object are estimated using the fish-eye lens image.

Effects of Fifth Embodiment

As described in detail above, the moving object location/attitude angle estimation device according to this embodiment selects the fish-eye lens image when the travel speed of the moving object is less than the predetermined value. Accordingly, even in a scene where blockage often occurs due to an obstacle, such as a traffic jam and an intersection where vehicles generally run at low speed, the fish-eye lens image in which the road edges are captured can be used.

Thus, the location and attitude angle of the moving object can be estimated in a more robust manner.

Sixth Embodiment

Next, with reference to the drawings, description is given of a moving object location/attitude angle estimation device according to a sixth embodiment of the present invention. Note that the moving object location/attitude angle estimation device according to this embodiment has the same configuration as that of the fourth embodiment, and thus detailed description thereof is omitted. Also, this embodiment can be applied to not only the fourth embodiment but also the fifth embodiment.

[Procedures of Moving Object Location/Attitude Angle Estimation Processing]

Figure 10:
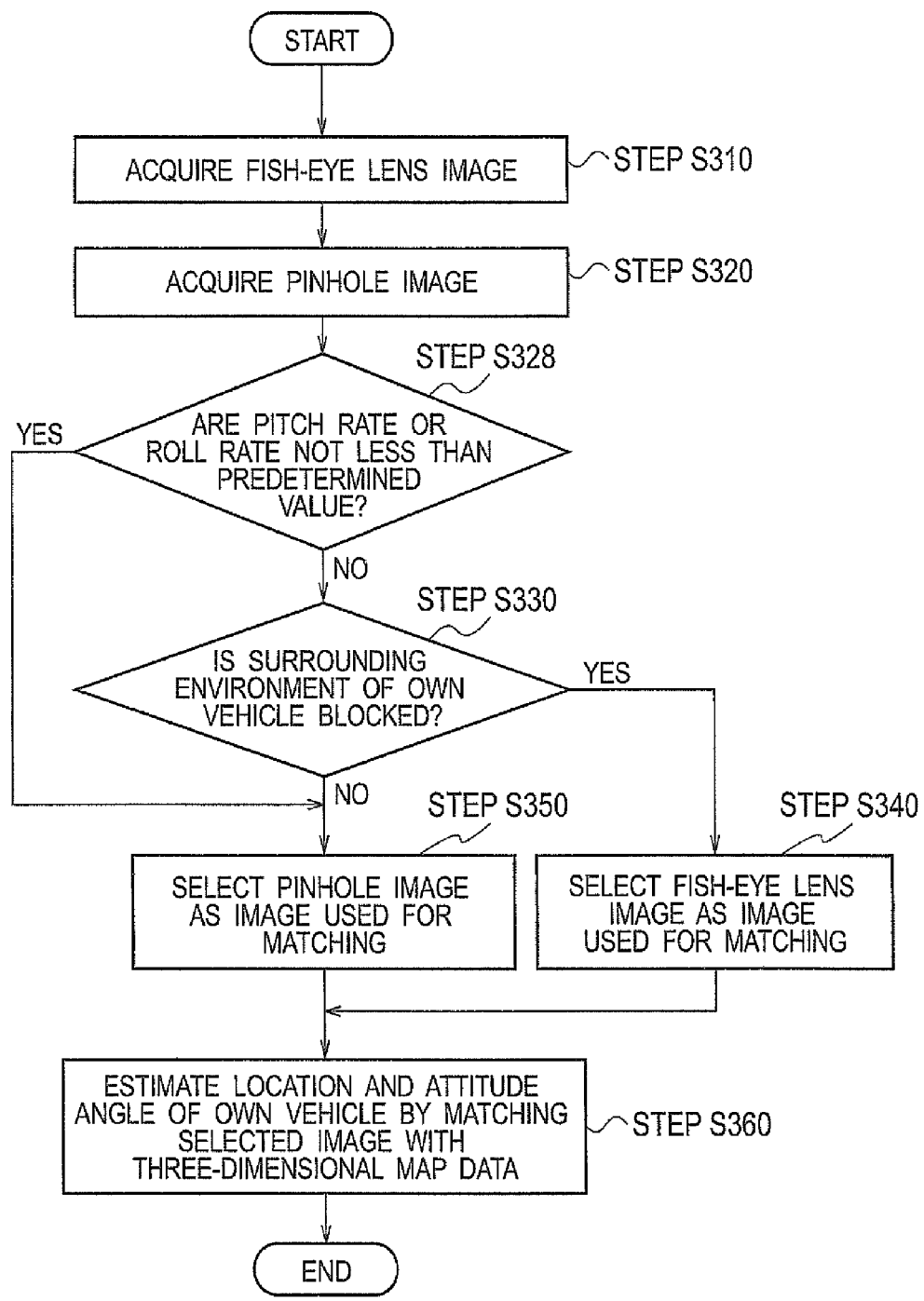
FIG. 10 is a flowchart showing processing procedures of moving object location/attitude angle estimation processing by a moving object location/attitude angle estimation device according to a sixth embodiment to which the present invention is applied.

Next, with reference to a flowchart of FIG. 10, description is given of procedures of moving object location/attitude angle estimation processing according to this embodiment. This embodiment is different from the fourth embodiment in including Step S328 of determining whether or not a pitch rate or a roll rate of the own vehicle is not less than a predetermined value.

In Step S328, the image selection unit 16 determines whether or not a pitch rate or a roll rate acquired by the three-axis gyro sensor 48 in the vehicle sensor group 4 is not less than a predetermined value. In this embodiment, it is determined whether or not the pitch rate or roll rate is not less than 3 [deg/s] as the predetermined value. Then, if the pitch rate or roll rate is not less than 3 [deg/s], the processing advances to Step S350 regardless of whether or not the pinhole image acquired in Step S320 is blocked. More specifically, the processing advances to Step S350 without carrying out the processing of Step S330. On the other hand, if the pitch rate or roll rate is less than 3 [deg/s], the processing advances to Step S330.

In this embodiment, when a time rate of change in a pitch angle or a roll angle of the own vehicle is large, e.g., when the vehicle runs on a bumpy road, the location and attitude angle of the own vehicle are estimated using the pinhole image. When the time rate of change in the pitch angle or roll angle of the moving object is large, the point of view of the camera vibrates. As a result, the road edges captured in the fish-eye lens image with large lens distortion are moved in a vibrating manner, and the shape thereof keeps constantly changing. This complicates matching with the three-dimensional map data, leading to increased computational load. Therefore, in such a scene, the location and attitude angle of the moving object are estimated using the pinhole image.

However, when it is detected that the left and right road edges are almost completely blocked on the pinhole image, the processing may advance to Step S340 to use the fish-eye lens image. Moreover, in such a case, the processing of Steps S330 to S360 may be suspended, and the odometry described in Step S120 of FIG. 4 may be calculated to estimate the location and attitude angle of the moving object. More specifically, in such a case as where the point of view of the camera vibrates and the camera is blocked, the matching between the camera image and the three-dimensional map data may be suspended, and the location and attitude angle of the moving object may be estimated from the odometry.

Effects of Sixth Embodiment

As described in detail above, the moving object location/attitude angle estimation device according to this embodiment selects the pinhole image when the time rate of change in the pitch angle of the moving object is not less than the predetermined value. Thus, even if the camera vibrates due to bumps, steps or the like in the road, the less distorted pinhole image can be used. As a result, the location and attitude angle of the moving object can be estimated more quickly in a more robust manner.

Moreover, the moving object location/attitude angle estimation device according to this embodiment selects the pinhole image when the time rate of change in the roll angle of the moving object is not less than the predetermined value. Thus, even if the camera vibrates due to bumps, steps or the like in the road, the less distorted pinhole image can be used. As a result, the location and attitude angle of the moving object can be estimated more quickly in a more robust manner.

Seventh Embodiment

Next, with reference to the drawings, description is given of a moving object location/attitude angle estimation device according to a seventh embodiment of the present invention. Note that the same constituent components as those of the first to sixth embodiments are denoted by the same reference numerals and detailed description thereof is omitted. Also, this embodiment can be applied to the first to sixth embodiments.

[Configuration of Moving Object Location/Attitude Angle Estimation Device]

Figure 11:
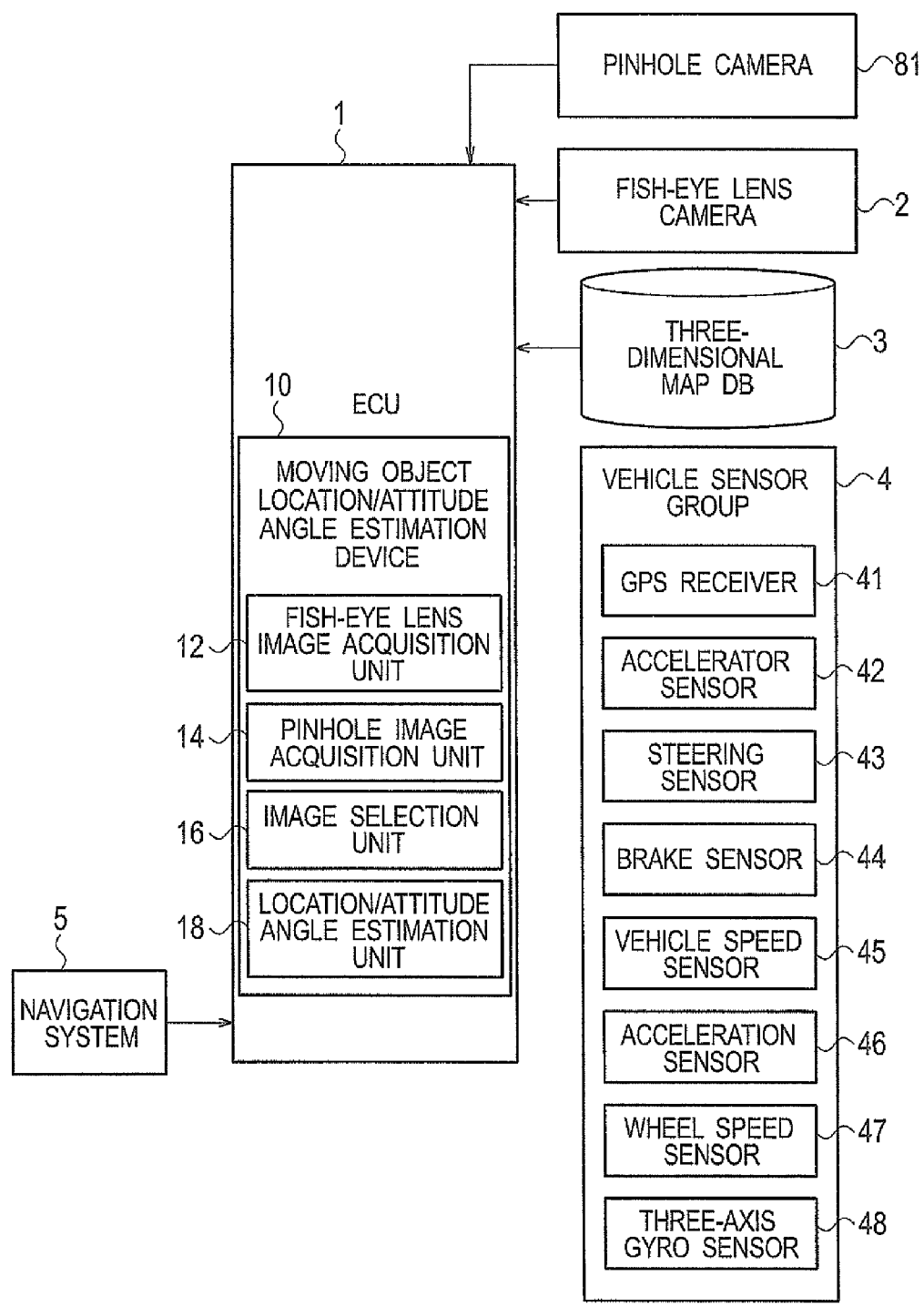
FIG. 11 is a block diagram showing a configuration of a moving object location/attitude angle estimation system including a moving object location/attitude angle estimation device according to a seventh embodiment to which the present invention is applied.

FIG. 11 is a block diagram showing a configuration of a moving object location/attitude angle estimation system including the moving object location/attitude angle estimation device according to this embodiment. As shown in FIG. 11, the moving object location/attitude angle estimation system according to this embodiment is different from those of the first to sixth embodiments in further including a pinhole camera 81.

The pinhole camera 81 is a narrow-angle lens camera using a solid-state image sensing device such as a CCD, for example. In this embodiment, the pinhole camera 81 is installed in such a manner that an optical axis is horizontal to a front bumper of the vehicle, and images of in front of the vehicle can be taken. The optical axis of the pinhole camera 81 coincides with the optical axis of the fish-eye lens camera 2, and a field angle of the pinhole camera 81 is about 40°.

A pinhole image taken with the pinhole camera 81 is an image capturing a range of the field angle 40° that is a predetermined region of a fish-eye lens image, and is a less distorted image. The taken pinhole image is transmitted to the ECU 1 from the pinhole camera 81, and is received by the pinhole image acquisition unit 14.

Therefore, in this embodiment, the pinhole image acquisition unit 14 acquires the pinhole image from the pinhole camera 81 without correcting distortion in the predetermined region of the fish-eye lens image.

Effects of Seventh Embodiment

As described in detail above, the moving object location/attitude angle estimation device according to this embodiment acquires the pinhole image from the pinhole camera that takes an image of the predetermined region of the fish-eye lens image. Thus, there is no need to correct distortion in the fish-eye lens image, and processing load can be reduced.

Note that the embodiments described above are an example of the present invention. Therefore, the present invention is not limited to the embodiments described above. Needless to say, various changes can be made to embodiments other than those described above according to design or the like without departing from the technical ideas of the present invention.

A moving object location/attitude angle estimation device and a moving object location/attitude angle estimation method according to one aspect of the present invention enable estimation of a location and an attitude angle of a moving object from a surrounding environment without a specific device such as a traffic light. Therefore, the moving object location/attitude angle estimation device and the moving object location/attitude angle estimation method according to the one aspect of the present invention are industrially applicable.

The invention claimed is:

1. A moving object location/attitude angle estimation device for estimating a location and an attitude angle of a moving object, comprising:
   a fish-eye lens camera configured to acquire a fish-eye lens image capturing a surrounding environment of the moving object with a fish-eye lens;
   pinhole image circuitry configured to acquire a less distorted pinhole image for a predetermined region of the fish-eye lens image;
   a vehicle sensor configured to detect a bend degree of a driving road in a travelling direction of the moving object; and
   a controller configured to:
      acquire a less distorted pinhole image for a predetermined region of the fish-eye lens image;
      select the pinhole image when the bend degree is less than a predetermined value;
      select the fish-eye lens image when the bend degree is not less than the predetermined value;
      estimate the location and the attitude angle of the moving object by matching an edge information of a selected image with an edge information of a virtual image extracted from a three-dimensional map data, wherein
         the location and the attitude angle of the moving object are estimated using a first method when the fish-eye lens image is selected and the location and the attitude angle of the moving object are estimated using a second method when the pinhole image is selected;
      determine whether or not left and right road edges in the travelling direction of the moving object can be captured in the pinhole image from a current location of the moving object; and
      select the fish-eye lens image only when it is determined that the left and right road edges in the travelling direction of the moving object cannot be captured in the pinhole image.

2. The moving object location/attitude angle estimation device according to claim 1, wherein the vehicle sensor detects a turning radius in the travelling direction of the moving object, and the controller selects the pinhole image by determining that the bend degree is less than the predetermined value when the turning radius is larger than a predetermined value, and selects the fish-eye lens image by determining that the bend degree is not less than the predetermined value when the turning radius is equal to or less than the predetermined value.

3. The moving object location/attitude angle estimation device according to claim 1, wherein the controller determines whether or not the surrounding environment of the moving object is blocked, based on the pinhole image acquired by the pinhole image circuitry, selects the fish-eye lens image by determining that the bend degree is not less than the predetermined value when the surrounding environment is blocked, and selects the pinhole image by determining that the bend degree is less than the predetermined value when the surrounding environment is not blocked.

4. The moving object location/attitude angle estimation device according to claim 3, wherein the controller selects the pinhole image by determining that the bend degree is less than the predetermined value when left and right road edges in the travelling direction of the moving object are not blocked.

5. The moving object location/attitude angle estimation device according to claim 1, wherein the pinhole image circuitry acquires the less distorted pinhole image by correcting distortion in the predetermined region of the fish-eye lens image acquired by the fish-eye lens camera.

6. The moving object location/attitude angle estimation device according to claim 1, wherein the pinhole image circuitry acquires the pinhole image from a pinhole camera configured to capture a predetermined region of the fish-eye lens image.

7. The moving object location/attitude angle estimation device according to claim 1, wherein the controller selects the fish-eye lens image when a travel speed of the moving object is less than a predetermined value.

8. The moving object location/attitude angle estimation device according to claim 1, wherein the controller selects the pinhole image when a time rate of change in a pitch angle of the moving object is not less than a predetermined value.

9. The moving object location/attitude angle estimation device according to claim 1, wherein the controller selects the pinhole image when a time rate of change in a roll angle of the moving object is not less than a predetermined value.

10. A moving object location/attitude angle estimation method of a moving object location/attitude angle estimation device for estimating a location and an attitude angle of a moving object, comprising:
   acquiring a fish-eye lens image capturing a surrounding environment of the moving object with a fish-eye lens;
   acquiring a less distorted pinhole image for a predetermined region of the fish-eye lens image;
   detecting a bend degree of a driving road in a travelling direction of the moving object;
   selecting the pinhole image when the bend degree is less than a predetermined value, and selecting the fish-eye lens image when the bend degree is not less than the predetermined value;
   estimating the location and the attitude angle of the moving object by matching an edge information of the selected image with an edge information of a virtual image extracted from a three-dimensional map data, wherein
      the location and the attitude angle of the moving object are estimated using a first method when the fish-eye lens image is selected and the location and the attitude angle of the moving object are estimated using a second method when the pinhole image is selected;
   determining whether or not left and right road edges in the travelling direction of the moving object can be captured in the pinhole image from a current location of the moving object; and selecting the fish-eye lens image only when it is determined that the left and right road edges in the travelling direction of the moving object cannot be captured in the pinhole image.

11. A moving object location/attitude angle estimation device for estimating a location and an attitude angle of a moving object, comprising:
   a fish-eye lens image acquisition means for acquiring a fish-eye lens image capturing a surrounding environment of the moving object with a fish-eye lens;
   a pinhole image acquisition means for acquiring a less distorted pinhole image for a predetermined region of the fish-eye lens image;
   an image selection means for detecting a bend degree of a driving road in a travelling direction of the moving object, selecting the pinhole image when the bend degree is less than a predetermined value, and selecting the fish-eye lens image when the bend degree is not less than the predetermined value; and
   a location/attitude angle estimation means for estimating the location and the attitude angle of the moving object by matching an edge information of the image selected by the image selection means with an edge information of a virtual image extracted from a three-dimensional map data, wherein
   the location and the attitude angle of the moving object are estimated using a first method when the fish-eye lens image is selected and the location and the attitude angle of the moving object are estimated using a second method when the pinhole image is selected,
   the image selection means determines whether or not left and right road edges in the travelling direction of the moving object can be captured in the pinhole image from a current location of the moving object and selects the fish-eye lens image only when it is determined that the left and right road edges in the travelling direction of the moving object cannot be captured in the pinhole image.

12. A moving object location/attitude angle estimation device for estimating a location and an attitude angle of a moving object, comprising:
   a fish-eye lens camera configured to acquire a fish-eye lens image capturing a surrounding environment of the moving object with a fish-eye lens;
   a pinhole image circuitry configured to acquire a less distorted pinhole image for a predetermined region of the fish-eye lens image;
   a vehicle sensor configured to detect a bend degree of a driving road in a travelling direction of the moving object; and
   a controller configured to:
      acquire a less distorted pinhole image for a predetermined region of the fish-eye lens image;
      select the pinhole image when the bend degree is less than a predetermined value;
      select the fish-eye lens image when the bend degree is not less than the predetermined value; and
      estimate the location and the attitude angle of the moving object by matching an edge information of a selected image with an edge information of a virtual image extracted from a three-dimensional map data, wherein
   the location and the attitude angle of the moving object are estimated using a first method when the fish-eye lens image is selected and the location and the attitude angle of the moving object are estimated using a second method when the pinhole image is selected,
   the first method is to match the edge information of the fish-eye lens image with the edge information of the virtual image extracted from the three-dimensional map data by using candidates for a virtual location and a virtual attitude angle, and
   the second method is to match the edge information of the pinhole image with edge image extracted from the three-dimensional map data through a camera model of the pinhole image.

* * * * *